US009280747B1

(12) United States Patent
Jin et al.

(10) Patent No.: US 9,280,747 B1
(45) Date of Patent: Mar. 8, 2016

(54) NORMALIZING ELECTRONIC COMMUNICATIONS USING FEATURE SETS

(71) Applicant: SAS Institute Inc., Cary, NC (US)

(72) Inventors: Ning Jin, Morrisville, NC (US); James Allen Cox, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/928,784

(22) Filed: Oct. 30, 2015

Related U.S. Application Data

(60) Provisional application No. 62/167,248, filed on May 27, 2015.

(51) Int. Cl.
*G06N 99/00* (2010.01)
*G06F 17/30* (2006.01)
*H04L 12/58* (2006.01)
*G06N 7/00* (2006.01)

(52) U.S. Cl.
CPC ............ *G06N 7/005* (2013.01); *G06F 17/3053* (2013.01); *G06N 99/005* (2013.01); *H04L 51/04* (2013.01)

(58) Field of Classification Search
None
See application file for complete search history.

(56) References Cited

U.S. PATENT DOCUMENTS

| | | | | |
|---|---|---|---|---|
| 2014/0163964 A1* | 6/2014 | Chen | ....................... | G06F 17/27 704/9 |
| 2015/0220509 A1* | 8/2015 | Karov Zangvil | ...... | G06F 3/0237 704/9 |
| 2015/0348062 A1* | 12/2015 | Gupta | ................ | G06Q 30/0201 705/7.29 |

OTHER PUBLICATIONS

Mitschick et al, Semantic Metadata Instantiation and Consolidation within an Ontology-based Multimedia Document Management System, 2008.*
Mikolov et al, Efficient Estimation of Word Representations in Vector Space, 2013.*
Lopez et al, Towards Electronic SMS Dictionary Construction: An Alignment-based Approach, 2014.*
Vilarino et al, A Machine-Translation Method for Normalization of SMS, 2013.*
Bilal Ahmed, "Lexical Normalisation of Twitter Data" Department of Computing and Information Systems, The University of Melbourne, Victoria, Australia, (Mar. 2013) 4 pages.

(Continued)

*Primary Examiner* — Stanley K Hill
*Assistant Examiner* — Mikayla Chubb
(74) *Attorney, Agent, or Firm* — Kilpatrick Townsend & Stockton LLP

(57) ABSTRACT

Electronic communications can be normalized using feature sets. For example, an electronic representation of a noncanonical communication can be received, and multiple candidate canonical versions of the noncanonical communication can be determined. A first feature set representative of the noncanonical communication can be determined by splitting the noncanonical communication into at least one n-gram and at least one k-skip-n-gram. Multiple comparison feature sets can be determined by splitting multiple terms in training data into respective comparison feature sets. Multiple Jaccard index values can be determined using the first feature set and the multiple comparison feature sets. A subset of the multiple terms in the training data in which an associated Jaccard index value exceeds a threshold can be selected. The subset of the multiple terms can be included in the multiple candidate canonical versions. A normalized version of the noncanonical communication can be selected from the multiple candidate canonical versions.

30 Claims, 9 Drawing Sheets

(56) References Cited

OTHER PUBLICATIONS

Leo Breiman, "Random Forests" Machine Learning, 45, 5-32, 2001 Kluwer Academic Publishers (2001) 28 pages.

Brown Peter et al., "Class-Based n-gram Models of Natural Language" Association for Computational Linguistics (1992) 14 pages.

Gimpel Kevin et al., "Part-of-Speech Tagging for Twitter: Annotation, Features, and Experiments" School of Computer Science, Carnegie Mellon University, Pittsburgh, PA (2011) 6 pages.

Han Bo et al., "Lexical Normalisation of Short Text Messages: Makn Sens a #twitter" NICTA Victoria Research Laboratory, Department of Computer Science and Software Engineering, The University of Melbourne (2011) 11 pages.

Han Bo et al., "Lexical Normalisation for Social Media Text" NICTA Victoria Research Laboratory, Department of Computer Science and Software Engineering, The University of Melbourne (2013) 28 pages.

White, Sarah et al., "Eye Movements When Reading Transposed Text: The Importance of Word-Beginning Letters" J Exp Psychol Hum Percept Perform (Oct. 2008) 34(5): 1261-1276. doi:10.1037/ 0096-1523.34.5.1261.

\* cited by examiner

| Word | Feature Set |
|---|---|
| "love" | "$lo", "ov", "ve$", "llv", "ole" |
| "looove" | "$lo", "oo", "ov", "ve$", "llo", "olo", "olv", "ole" |

904

1002
Determine a support value associated with the candidate canonical version and provide the support value to the classifer

1004
Determine a confidence value associated with the candidate canonical version and provide the confidence value to the classifier

1006
Determine a similarity score associated with the candidate canonical version and provide the similarity score to the classifier

1008
Determine a part of speech (POS) tag confidence associated with the candidate canonical version (e.g., using a part of speech tagger) and provide the POS tag confidence to the classifier

FIG. 10

|  | Precision | Recall | F1 Score |
|---|---|---|---|
| Using all parameters | 0.9061 | 0.7865 | 0.8421 |
| Not using support value or confidence value | 0.9423 | 0.6803 | 0.7901 |
| Not using POS tagging confidence | 0.902 | 0.7673 | 0.8292 |
| Not using similarity score | 0.9102 | 0.7825 | 0.8416 |

FIG. 11

NORMALIZING ELECTRONIC COMMUNICATIONS USING FEATURE SETS

REFERENCE TO RELATED APPLICATION

This claims the benefit of priority under 35 U.S.C. §119(e) to U.S. Provisional Patent Application No. 62/167,248, titled "Lexical Normalization for English Twitter Text" and filed May 27, 2015, the entirety of which is hereby incorporated by reference herein.

TECHNICAL FIELD

The present disclosure relates generally to normalizing electronic communications. More specifically, but not by way of limitation, this disclosure relates to normalizing electronic communications using feature sets.

BACKGROUND

With the rise of the Internet and mobile electronic devices, users are generating increasing amounts of electronic content. Electronic content often takes the form of forum posts, text messages, social networking posts, blog posts, e-mails, or other electronic communications. In many cases, electronic content can include shorthand words, slang, acronyms, misspelled words, incorrect grammar, and other informalities.

SUMMARY

In one example, a computer readable medium comprising program code executable by a processor is provided. The program code can cause the processor to receive an electronic representation of a noncanonical communication. The program code can cause the processor to determine a plurality of candidate canonical versions of the noncanonical communication using a database generated using training data. The program code can cause the processor to determine a first feature set representative of the noncanonical communication by splitting the noncanonical communication into at least one n-gram and at least one k-skip-n-gram. The n-gram can comprise a sequence of a predefined number of adjacent characters. The k-skip-n-gram can comprise a sequence of nonadjacent characters in a communication selected such that a maximum number of skipped characters are positioned between each of the nonadjacent characters in the communication. The program code can cause the processor to determine a plurality of comparison feature sets by splitting each term in a plurality of terms in the training data into a respective comparison feature set comprising at least one n-gram and at least one k-skip-n-gram. The program code can cause the processor to determine a plurality of Jaccard index values using the first feature set and the plurality of comparison feature sets. Each Jaccard index value of the plurality of Jaccard index values can be representative of a similarity between the noncanonical communication and a term of the plurality of terms in the training data. The program code can cause the processor to select a subset of the plurality of terms in the training data in which an associated Jaccard index value exceeds a threshold. The program code can cause the processor to include the subset of the plurality of terms in the plurality of candidate canonical versions of the noncanonical communication. The program code can cause the processor to select a normalized version of the noncanonical communication from the plurality of candidate canonical versions.

In another example, a method is provided that can include receiving an electronic representation of a noncanonical communication. The method can include determining a plurality of candidate canonical versions of the noncanonical communication using a database generated using training data. The method can include determining a first feature set representative of the noncanonical communication by splitting the noncanonical communication into at least one n-gram and at least one k-skip-n-gram. The n-gram can comprise a sequence of a predefined number of adjacent characters in a communication. The k-skip-n-gram can comprise a sequence of nonadjacent characters in the communication selected such that a maximum number of skipped characters are positioned between each of the nonadjacent characters in the communication. The method can include determining a plurality of comparison feature sets by splitting each term in a plurality of terms in the training data into a respective comparison feature set comprising at least one n-gram and at least one k-skip-n-gram. The method can include determining a plurality of Jaccard index values using the first feature set and the plurality of comparison feature sets. Each Jaccard index value of the plurality of Jaccard index values can be representative of a similarity between the noncanonical communication and a term of the plurality of terms in the training data. The method can include selecting a subset of the plurality of terms in the training data in which an associated Jaccard index value exceeds a threshold. The method can include including the subset of the plurality of terms in the plurality of candidate canonical versions of the noncanonical communication. The method can include selecting a normalized version of the noncanonical communication from the plurality of candidate canonical versions.

In another example, a system is provided that can include a processing device and a memory device. The memory device can include instructions executable by the processing device for causing the processing device to receive an electronic representation of a noncanonical communication. The instructions can cause the processing device to determine a plurality of candidate canonical versions of the noncanonical communication using a database generated using training data. The instructions can cause the processing device to determine a first feature set representative of the noncanonical communication by splitting the noncanonical communication into at least one n-gram and at least one k-skip-n-gram. The n-gram can comprise a sequence of a predefined number of adjacent characters. The k-skip-n-gram can comprise a sequence of nonadjacent characters in a communication selected such that a maximum number of skipped characters are positioned between each of the nonadjacent characters in the communication. The instructions can cause the processing device to determine a plurality of comparison feature sets by splitting each term in a plurality of terms in the training data into a respective comparison feature set comprising at least one n-gram and at least one k-skip-n-gram. The instructions can cause the processing device to determine a plurality of Jaccard index values using the first feature set and the plurality of comparison feature sets. Each Jaccard index value of the plurality of Jaccard index values can be representative of a similarity between the noncanonical communication and a term of the plurality of terms in the training data. The instructions can cause the processing device to select a subset of the plurality of terms in the training data in which an associated Jaccard index value exceeds a threshold. The instructions can cause the processing device to include the subset of the plurality of terms in the plurality of candidate canonical versions of the noncanonical communication. The instructions can cause the processing device to select a normalized version of the noncanonical communication from the plurality of candidate canonical versions.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 10 is a flow chart of an example of a process for determining a confidence score for a candidate canonical version using a classifier according to some aspects.

FIG. 11 shows a table of an example of results using the constrained mode implementation while varying the different parameters used by a classifier according to some aspects.

Figure 1:
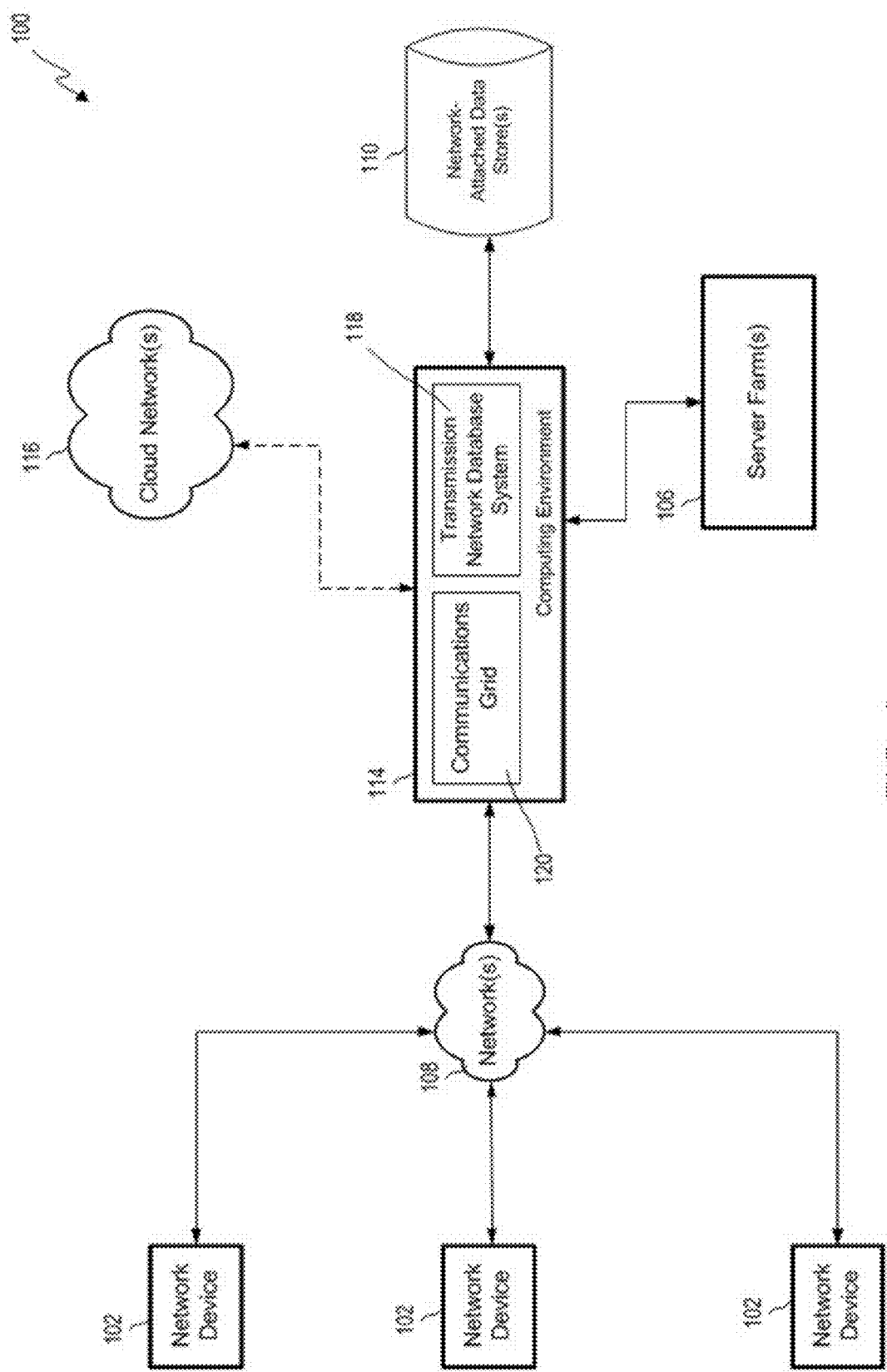
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provide those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to normalizing electronic communications using feature sets. An electronic communication can include a communication from an electronic device, such as a computing device. The electronic communication can include one or more (textual) words that are in a noncanonical form. In some examples, a word can be in a noncanonical form if the word is misspelled according to an accepted and standardized spelling of the word or does not comport with one or more standardized grammatical rules. For example, "ur" can be a noncanonical form of the word "you're." As another example, "you're" can be a noncanonical form of the word "your," if the grammatical context calls for the word "your" rather than "you're." A word can additionally or alternatively be in a noncanonical form if the word includes a combination of two or more sub-words. For example, "yessir" can be a noncanonical form of the words "yes sir," "wassup" can be a noncanonical form of the words "what is up" or "what's up," and "lemmeknow" can be a noncanonical form of the words "let me know." A word that is in a noncanonical form can be referred to as a noncanonical word, and an electronic communication containing a noncanonical word can be referred to as a noncanonical communication. It can be challenging to analyze noncanonical words in an electronic communication, such as to perform textual analysis. It can be desirable to normalize noncanonical words into their canonical forms, such as to simplify computerized textual analysis.

In some examples, a computing device can determine the canonical forms of noncanonical words using feature sets. A feature set can include one or more features that are characteristic of a word (e.g., as described in greater detail with respect to FIG. 5). In some examples, the computing device can determine one feature set associated with a noncanonical word and another feature set associated with a candidate canonical version of the noncanonical word. The computing device can determine a Jaccard index value indicating a similarity between the two feature sets. The computing device can include the candidate canonical version of the noncanonical word in a data set of multiple candidate canonical versions of the noncanonical word if the Jaccard index value exceeds a threshold. In some examples, the computing device can use a classifier to determine which of the multiple candidate canonical versions is the correct canonical version of the noncanonical word.

As discussed above, in some examples, the computing device can use a classifier to determine a correct canonical version of a noncanonical word. In some examples, the classifier can generate a confidence score associated with each candidate canonical version of the noncanonical word. The classifier can select the candidate canonical version associated with the highest confidence score as the correct canonical version of the noncanonical word. Examples of parameters used by the classifier to determine the confidence score are discussed with respect to FIG. 10.

FIGS. 1-4 depict examples of systems usable for normalizing electronic communications using feature sets. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120.

Data transmission network 100 also includes one or more network devices 102. Network devices 102 may include client devices that can communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices can transmit electronic messages with noncanonical information, either all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data with noncanonical information to a network-attached data store 110 for storage. The computing environment 114 may later retrieve the data from the network-attached data store 110 and use the data for textual analysis.

The network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores 110 may include storage other than primary storage located within computing environment 114 that is directly accessible by processors located therein. Network-attached data stores 110 may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as data from a website (e.g., a forum post, a Twitter™ tweet, a Facebook™ post, a blog post, an online review), a text message, an e-mail, or any combination of these.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. As another example, website data may be analyzed to determine one or more trends in comments, posts, or other data provided by users.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing data analytics or textual analysis on data that includes noncanonical information.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for normalizing electronic communications using feature sets. For example, the computing environment 114, a network device 102, or both can implement one or more versions of the processes discussed with respect to FIGS. 5-14.

Figure 2:
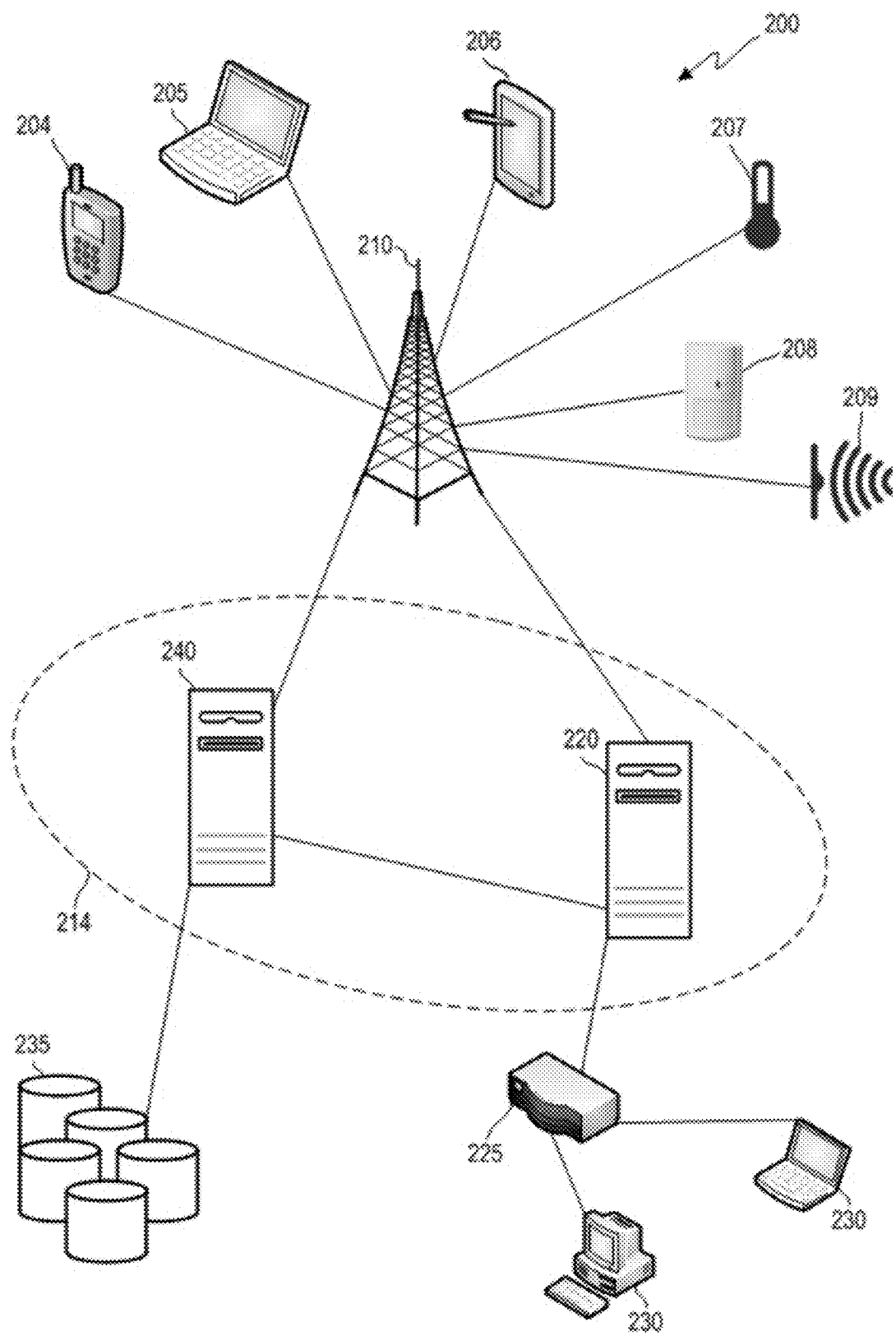
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include noncanonical information. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can transform data that includes noncanonical information into a canonical format before transmitting the data to the computing environment 214 for further processing (e.g., which can include applying big data analytics or textual analysis to the data).

Computing environment 214 may include machines 220, 240. Although computing environment 214 is shown in FIG. 2 as having two machines, 220 and 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices 204-209 may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, media content (e.g., audio and/or video content), streaming content, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which textual analysis is performed on one or more electronic communications, the computing environment 214 can perform pre-analysis of the one or more electronic communications. The pre-analysis can include normalizing the electronic communications by converting one or more noncanonical words in an electronic communication into a canonical version of the noncanonical word. The computing environment 214 can determine the canonical version of the noncanonical word at least in part by using feature sets.

Figure 3:
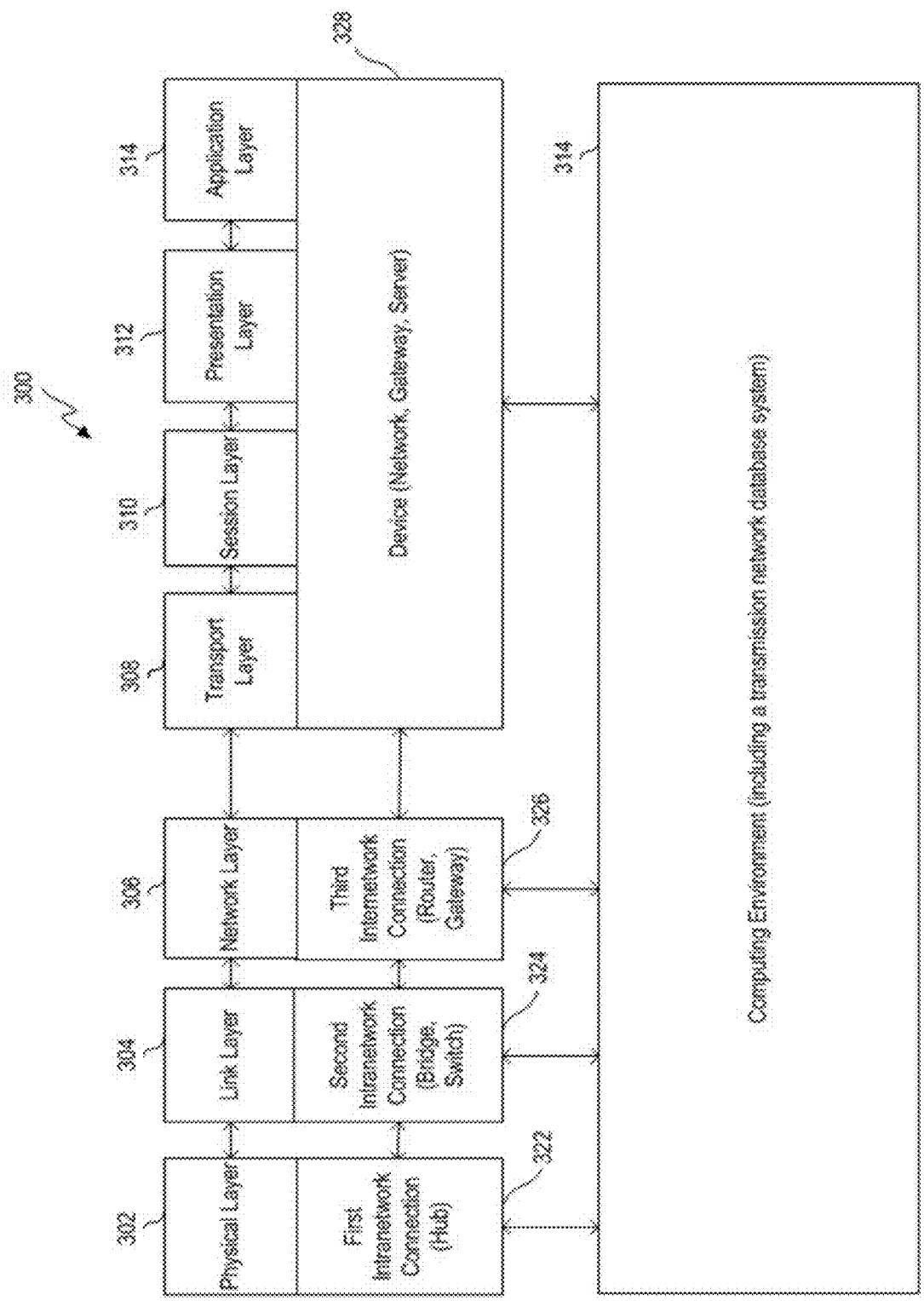
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes noncanonical information to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a textual analysis application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control devices from which it can receive data from. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for normalizing electronic communications using feature sets.

Figure 4:
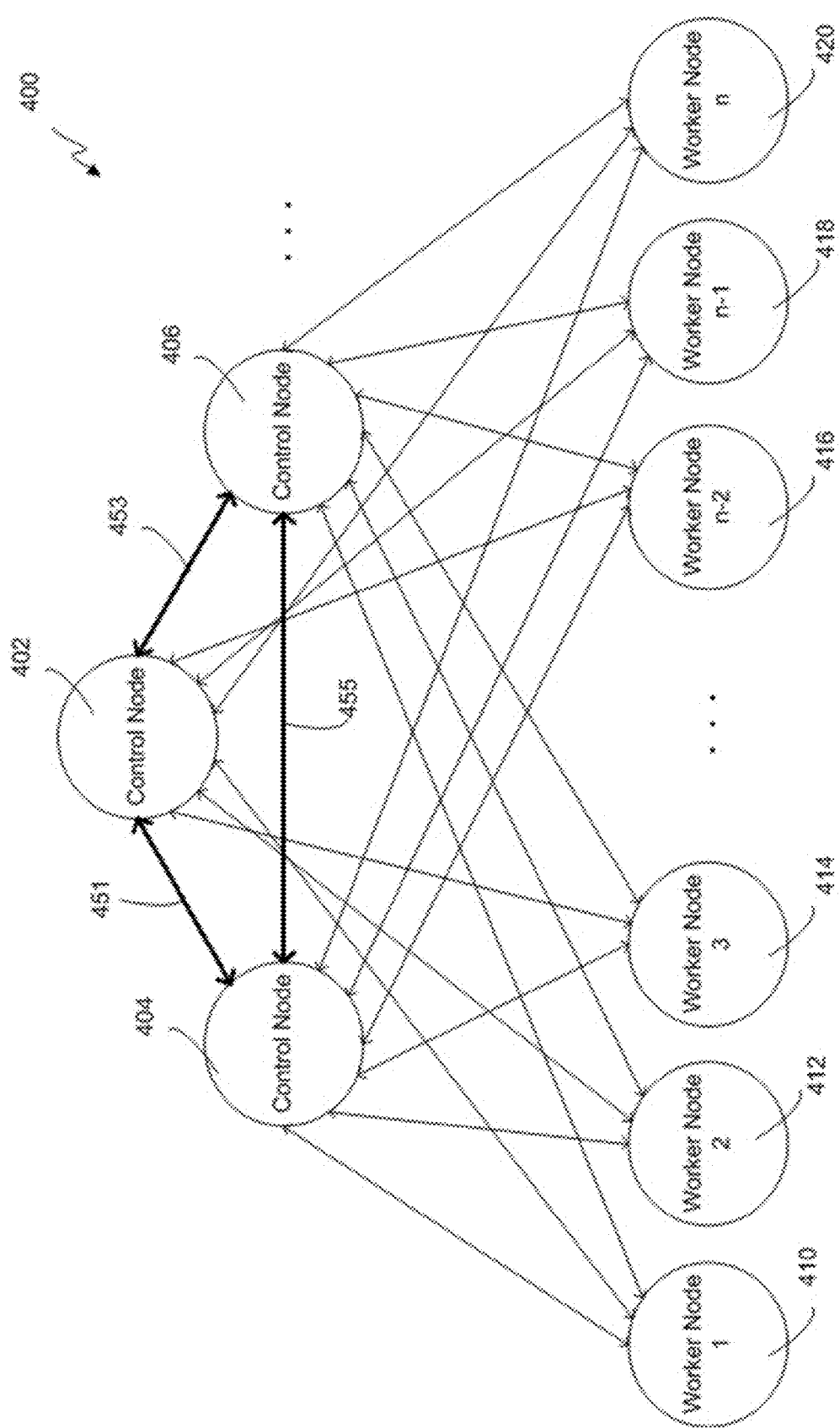
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes 402-406 are communicatively connected via communication paths 451, 453, and 455. The control nodes may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a textual analysis job being performed or an individual task within a textual analysis job being performed by that worker node. In some examples, worker nodes may not be connected (communicatively or otherwise) to certain other worker nodes. For example, a worker node 410 may only be able to communicate with a particular control node 404. The worker node 410 may be unable to communicate with other worker nodes 412-420 in the communications grid, even if the other worker nodes 412-420 are controlled by the same control node 404.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a textual analysis project or a normalization project for transforming a noncanonical communication into a canonical form. The project may include a data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for normalizing an electronic communication using feature sets can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 402 may perform analysis or normalization on a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 404, 406 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, electronic communications can be normalized using such a communications grid computing system 400.

Figure 5:
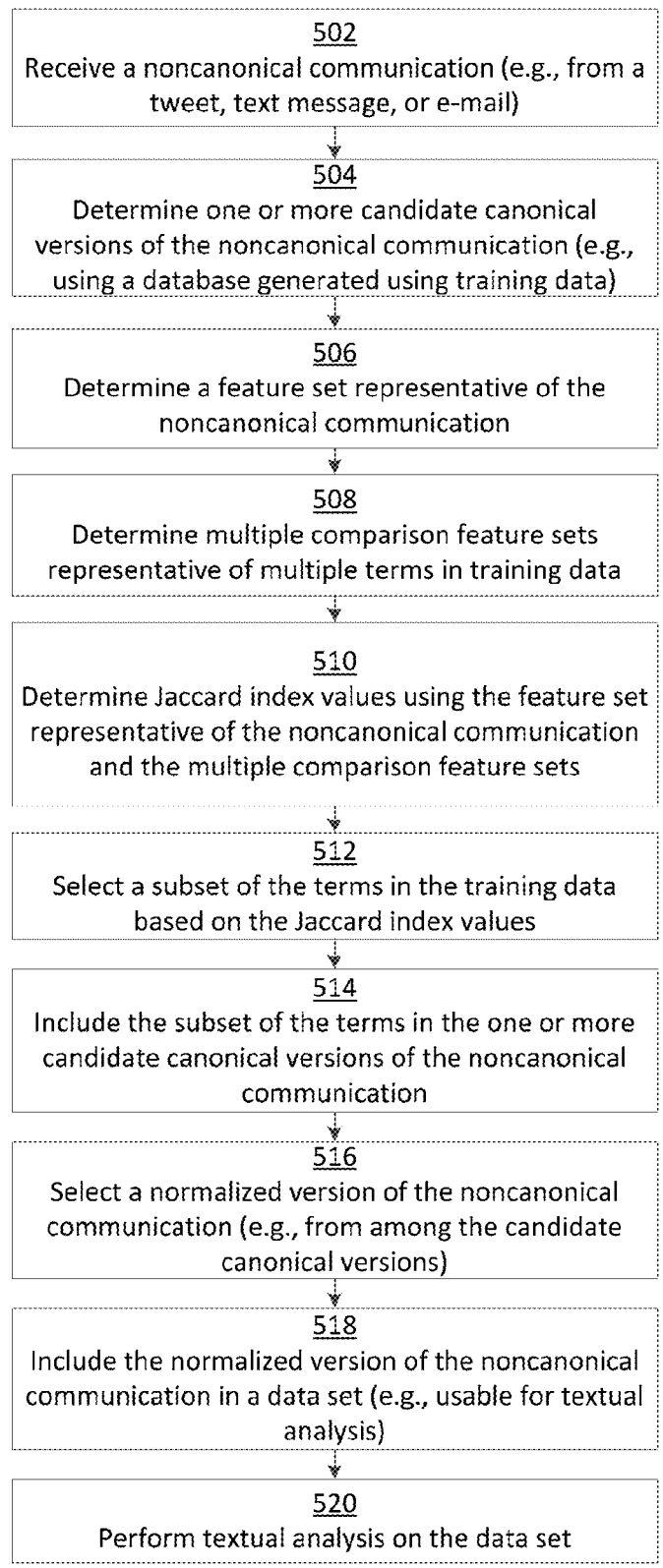
FIG. 5 is a flow chart of an example of a process for normalizing electronic communications using features sets according to some aspects.

FIG. 5 is a flow chart of an example of a process for normalizing electronic communications using feature sets according to some aspects. Some examples can be implemented using any of the systems and configurations described with respect to FIGS. 1-4.

In block 502, a processor receives a noncanonical communication. The noncanonical communication can include one or more words that are in a noncanonical form. As discussed above, a word can be in a noncanonical form if the word is misspelled according to an accepted and standardized spelling of the word; does not comport with one or more standardized grammatical rules; includes two or more sub-words; or any combination of these. A shorthand version of a word, a misspelled version of the word, a grammatically incorrect version of the word, or a combination of two words (e.g., without proper grammatical delineation between the words) can be examples of noncanonical forms of the word.

The processor can receive the noncanonical communication in an electronic form. For example, the processor can receive an electronic representation of the noncanonical communication over a network. In some examples, the noncanonical communication can include data from a forum post, a text message, an e-mail, a social media post (e.g., a Twitter™ tweet or a Facebook™ post), a blog post, an online review, an electronic document, an electronic communication from an electronic mobile device, or any combination of these. In some examples, the noncanonical communication can be part of, associated with, or included within media content (e.g., audio and/or video content), such as streaming media content. For example, the noncanonical communication can be included with streaming textual captions provided with video content.

In block 504, the processor determines one or more candidate canonical versions of the noncanonical communication. In some examples, the processor can determine the candidate canonical version(s) of the noncanonical communication using a database (e.g., a lookup table). The database can be stored in memory. The database can map noncanonical words to one or more corresponding canonical versions of the noncanonical words. An example of such a database can include database 606 shown in FIG. 6. In the database 606, the noncanonical word "ur" is mapped to the canonical versions "you are" and "your", the noncanonical word "niiice" is mapped to the canonical version "nice", the noncanonical word "luv" is mapped to the canonical version "love", etc. The processor can determine the candidate canonical version(s) of the noncanonical communication at least in part by mapping the noncanonical word of the noncanonical communication to one or more corresponding canonical versions stored in the database. For example, the processor can determine that the candidate canonical versions of the noncanonical word "ur" include "you are" and "your" based on the database 606.

In some examples, the processor can automatically generate at least a portion of the database using training data. For example, the processor can generate at least a portion of the database by applying the training data to a neural network, which can responsively generate the database. In some examples, a user can generate at least a portion of the database. For example, referring to FIG. 6, the processor can receive training data including noncanonical communications 602*a-c* and apply the training data to a neural network. The neural network can map each word in the noncanonical communications 602*a-c* to a corresponding canonical version of the word (e.g., as shown in dashed areas 604*a-c* respectively). The processor can build the database 606 at least in part by using the determined mappings between each noncanonical word in the noncanonical communications 602*a-c* and the associated canonical versions.

In some examples, the processor can determine that the candidate canonical version(s) of the noncanonical communication additionally or alternatively includes a noncanonical word itself. For example, if the noncanonical communication includes the noncanonical word "ur", the candidate canonical versions can include "ur", "you are", and "your". As another example, if the noncanonical word is "looove", and there is no corresponding canonical version in database 606, the processor can determine that the candidate canonical version(s) of the noncanonical communication includes "looove".

Figures 6, 7:
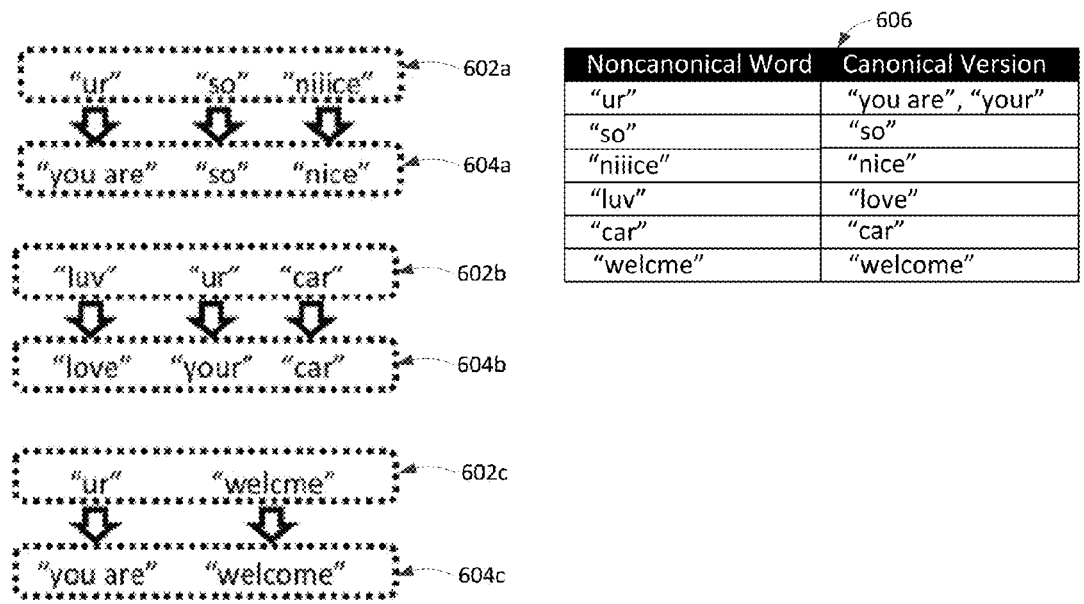
FIG. 6 is an example of training data and a database generated using the training data according to some aspects.
FIG. 7 shows an example of a list of feature sets for the words "love" and "looove" when n=2 and k=1 according to some aspects.

Returning to FIG. 5, in block 506, the processor determines a feature set representative of the noncanonical communication (e.g., representative of a noncanonical word of the noncanonical communication). In some examples, the processor can determine the feature set representative of the noncanonical communication by splitting at least one noncanonical word in the noncanonical communication into, for example, an n-gram, a k-skip-n-gram, a bigram, a trigram, or any combination of these. An n-gram can include a sequence of n adjacent characters in the noncanonical word. A k-skip-n-gram can include a sequence of nonadjacent characters selected such that k skipped characters are positioned between each of the non-adjacent characters in the noncanonical word. In some examples, the processor can prepend a "$" symbol to an n-gram when the n-gram appears at the beginning of the word. The processor can append a "$" symbol to an n-gram where the n-gram appears at the end of the word. The processor can include a "|" symbol to indicate a gap in a k-skip-n-gram. FIG. 7 shows an example of a list of feature sets 700 for the words "love" and "looove" when n=2 and k=1.

In block 508 of FIG. 5, the processor determines multiple comparison feature sets representative of multiple terms in training data. A comparison feature set can include a feature set usable by the processor in a comparison, as discussed in greater detail with respect to block 510. In some examples, the processor can determine the comparison feature sets by splitting each term in the training data into a respective comparison feature set.

Figures 8, 9:
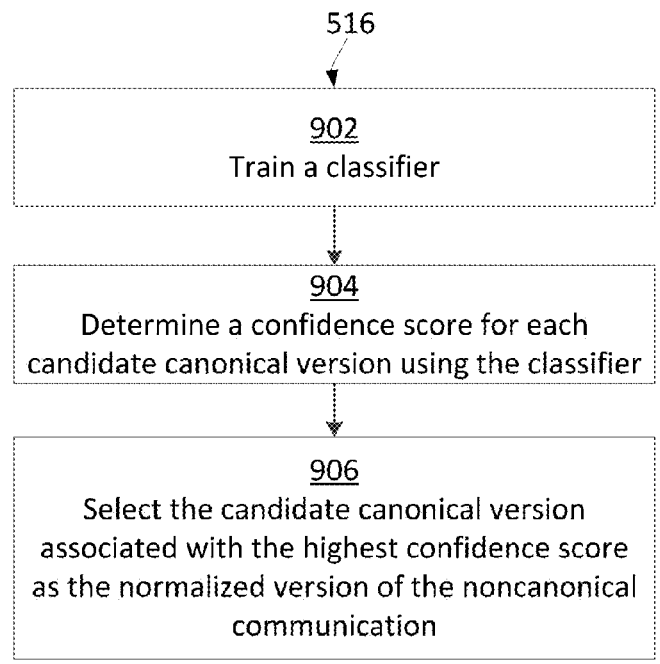
FIG. 8 shows an example of a list of feature sets for the words "car" and "cat" when n=2 and k=1 according to some aspects.
FIG. 9 is a flow chart of an example of a process for selecting a normalized version of a noncanonical communication according to some aspects.

Each comparison feature set can include an n-gram, a k-skip-n-gram, a bigram, a trigram, or any combination of these. For example, if the training data includes the terms "car" and "cat", the processor can determine a comparison feature set for "car" by splitting "car" into one or more n-grams, k-skip-n-grams, or both. The processor can also determine another comparison feature set for "cat" by splitting "cat" into one or more n-grams, k-skip-n-grams, or both. FIG. 8 shows an example of a list of feature sets 800 for the words "car" and "cat" when n=2 and k=1.

In block 510 of FIG. 5, the processor can determine Jaccard index values using the feature set representative of the noncanonical communication and the multiple comparison feature sets. For example, the processor can determine a Jaccard index value associated with each of the comparison feature sets. The processor can determine a Jaccard index value by applying the feature set representative of the noncanonical communication and a comparison feature set to the following equation:

$$\text{JaccardIndex}(f(s_1), f(s_2)) = |f(s_1) \cap f(s_2)| / |f(s_1) \cup f(s_2)|$$

where $f(s_1)$ can include the feature set representative of the noncanonical communication, $f(s_2)$ can include a comparison feature set, and $\text{JaccardIndex}(f(s_1), f(s_2))$ can include the Jaccard index value for $f(s_1)$ and $f(s_2)$.

For example, the Jaccard index value for "looove" (e.g., the noncanonical communication) and "love" (e.g., a comparison term) can be determined by referring to FIG. 7. As can be seen in FIG. 7, "looove" and "love" share four similarity features, namely "$lo", "ov", "ve$", and "o|e". Thus, four can be the numerator in the above equation. The union of the feature sets for "looove" and "love" can include nine similarity features, namely "$lo", "oo", "ov", "ve$", "l|v", "l|o", "o|o", "o|v", and "o|e". Thus, nine can be the denominator in the above equation. Therefore, the Jaccard index value for "looove" and "love" can be 4/9=0.44. The Jaccard index value can represent a similarity between the noncanonical communication and a term associated with a particular comparison feature set. For example, the Jaccard index value of 0.44 can indicate that "looove" is 44% similar to "love".

In some examples, the processor can assign different weights to different similarity features of a comparison feature set for determining a weighted Jaccard index value. The processor can assign different weights to different similarity features because, for example, n-grams and k-skip-n-grams can have a different importance when in different positions. For instance, if a weight of 3 is assigned to n-grams at the beginning of a word and at the end of the word, and a weight of 1 is assigned to all other similarity features, the Jaccard Index value for "looove" and "love" can be 8/13=0.615.

In some examples, using the Jaccard index value to determine a similarity between two inputs can provide numerous advantages. For example, the Jaccard index value equation can treat repetition of characters more consistently than other methods. For instance, both "looove" and "loooooove" can be determined to be equally similar to "love" using the Jaccard index value. But using other methods, such as Levenshtein distance, "loooooove" can be determined to be more dissimilar to "love" than "looove". As another example, determining a Jaccard index value can require less computational complexity and resources than other methods. For example, the Jaccard index value equation can include a linear equation and the Levenshtein distance equation can include a quadratic equation. The linear equation can require fewer computations to solve than the quadratic equation.

In some examples, the processor can determine a Jaccard index value associated with only a subset of the comparison feature sets. For example, the processor can analyze a comparison feature set to determine if the comparison feature set shares at least a minimum number of similarity features (e.g., one) with the noncanonical communication's feature set. If not, the processor can discard comparison feature set. If so, the processor can determine the Jaccard index value for the comparison feature set. Determining the Jaccard index value for comparison feature sets that include at least a minimum number of shared similarity features with the noncanonical communication's feature set may increase processing efficiency.

In some examples, the processor can estimate a value for $|f(s_1) \cup f(s_2)|$ in the Jaccard index value equation based on the lengths of strings $f(s_1)$ and $f(s_2)$. For example, if the length of $f(s_1)$ is 7, and the length of $f(s_2)$ is 11, the processor can estimate that a value for $|f(s_1) \cup f(s_2)|$ will be between 11 and 18. This can prevent the processor from having to actually calculate $|f(s_1) \cup f(s_2)|$, which can increase processing efficiency.

In block 512, the processor selects a subset of the terms in the training data based on the Jaccard index values. In some examples, the processor can generate a list in which the terms in the training data are ranked from highest Jaccard index value to lowest Jaccard index value. The processor can select the top m terms (e.g., the top 3 terms) having the highest Jaccard index values from the list, where m can be input by a user or determined based on an algorithm.

In some examples, the processor can select a subset of the terms in the training data which have associated Jaccard index values exceeding a threshold. The threshold can be input by a user or determined based on one or more algorithms. For example, the processor can select the terms having an associated Jaccard index value that is greater than or equal to 0.4.

In block 514, the processor includes the subset of the terms in the one or more candidate canonical versions of the noncanonical communication. For example, the processor can add the subset of the terms to a list including the candidate canonical versions of the noncanonical communication.

In block 516, the processor selects a normalized version of the noncanonical communication. The processor can select the normalized version of the noncanonical communication from the candidate canonical versions using a classifier (e.g., as described in greater detail with respect to FIGS. 9-10). In some examples, the processor can select the normalized version of the noncanonical communication according to the steps shown in FIG. 9 and described in greater detail below.

In block 518, the processor includes the normalized version of the noncanonical communication in a data set. The data set can be usable for textual analysis. For example, the data set can be configured to be analyzed to detect one or more characteristics or trends associated with the data set. In one example, the processor can include the normalized version of the noncanonical communication in a data set that includes multiple Twitter™ tweets. The data set can be analyzed using a textual analysis program to determine a customer sentiment about a brand indicated by the Twitter™ tweets or other streaming text data.

In block 520, the processor performs textual analysis on the data set. For example, the processor can use a textual analysis program (e.g., stored in memory) to analyze one or more characteristics of the data set to determine a trend, pattern, or other information indicated by the data set. The processor can provide such information to a user. Examples of such information can include a sentiment, such as a user sentiment about a brand; an emotion, such as an emotion tied to a particular product launch; a statistic, such as a number of times a user posted about a particular product; etc.

FIG. 9 is a flow chart of an example of a process for selecting a normalized version of a noncanonical communication according to some aspects.

In block 902, a classifier is trained. The classifier can include a binary classifier. An example of the classifier can include a random forest classifier.

A processor, a user, or both can train the classifier. For example, a user can analyze training data to determine correlations between noncanonical words and candidate canonical versions of the noncanonical words. If the user determines that a candidate canonical version of a noncanonical word is correct, a user can label the correlation as class 1. If the user determines that the candidate canonical version of a noncanonical word is incorrect, the user can label the correlation as class 0. In some examples, the processor can use the labeled correlations to train the classifier.

In block 904, the processor can determine a confidence score for each candidate canonical version using the classifier. The confidence score can represent a confidence of the classifier that the candidate canonical version is the correct canonical version of the noncanonical communication. The processor can determine the confidence score for each candidate canonical version by providing data associated with each candidate canonical version to the classifier.

In some examples, the processor can perform one or more steps shown in FIG. 10 to determine a confidence score for a candidate canonical version. For example, referring now to FIG. 10, in block 1002 the processor can determine a support value associated with the candidate canonical version and provide the support value to the classifier. The classifier can use the support value to determine the confidence score for the canonical version. A support value can include a number of times the candidate canonical version appears in training data (e.g., the training data described with respect to block 504). For example, referring to FIG. 6, a support value for "ur" can be three, because "ur" appears once in noncanonical communication 602*a*, once in noncanonical communication 602*b*, and once noncanonical communication 602*c*. As another example, a support value for "looove" can be zero, because "looove" does not appear in the canonical forms as shown in dashed areas 604*a*-*c*. The classifier can determine a higher confidence score for a candidate canonical version associated with a higher support value.

In block 1004 of FIG. 10, the processor can determine a confidence value associated with the candidate canonical version and provide the confidence value to the classifier. The classifier can use the confidence value to determine the confidence score for the canonical version. A confidence value can include a ratio of a number of times the candidate canonical version is selected as the normalized version of the noncanonical communication divided by a total amount of times the noncanonical communication appears in training data. For example, the confidence value can be determined according to the following algorithm:

ConfidenceValue=Candidate_Selected/Num_NoncanonicalCommuncation where ConfidenceValue is the confidence value, Candidate_Selected is the number of times the candidate was selected as the normalized version of the noncanonical communication, and Num_NoncanonicalCommuncation is the total amount of times the noncanonical communication appears in training data.

For example, referring to FIG. 6, a confidence value that "your" is the correct canonical form of "ur" can be ⅓=0.33, because "your" was selected as the correct canonical version one time (in dashed area 604*b*) and "ur" appears three total times (once in each of noncanonical communications 602*a*-*c*). As another example, a confidence value for "looove" can be zero, because "looove" does not appear in the noncanonical communications 602*a*-*c* (or the corresponding canonical versions of the words shown in dashed areas 604*a*-*c*). The classifier can determine a higher confidence score for a candidate canonical version associated with a higher confidence value.

Referring back to FIG. 10, in block 1006, the processor can determine a similarity score associated with the candidate canonical version and provide the similarity score to the classifier. The classifier can use the similarity score to determine the confidence score for the candidate canonical version. The similarity score can include the Jaccard index value of the candidate canonical version and the noncanonical communication. The processor can determine the Jaccard index value and provide the Jaccard index value to the classifier. In some examples, the classifier can determine a higher confidence score for a candidate canonical version associated with a higher similarity score.

In some examples, the similarity score can be a good indicator of a similarity between the candidate canonical version and the noncanonical communication if a difference between the candidate canonical version and the noncanonical communication is due to a misspelling (e.g., "hello" and "helo"). Conversely, the similarity score can be less accurate if the difference between the candidate canonical version and the noncanonical communication is due to an abbreviation (e.g., "lol" and "laughing out loud"). In some examples, the classifier can determine a difference in a length between the candidate canonical version and the noncanonical communication. For example, the difference in length between "lol" and "laughing out loud" can be 14 characters. In some examples, if the difference in length exceeds a threshold, the classifier can ignore the similarity score when determining the confidence score for the candidate canonical version. This can prevent the classifier from determining an erroneous confidence score due to an unreliable similarity score.

The classifier can additionally or alternatively take into account other features of the candidate canonical version to determine a confidence score. For example, the classifier can use distributions of letters, numerals, and special characters to determine the confidence score.

In block 1008, the processor determines a part of speech (POS) tag confidence associated with the candidate canonical version and provides the POS tag confidence to the classifier. The classifier can use the POS tag confidence to determine the confidence score for the candidate canonical version. In some examples, the classifier can determine a higher confidence score for a candidate canonical version associated with a higher POS tag confidence.

The processor can determine the POS tag confidence using a POS tagger. A POS tagger can include one or more algorithms or neural networks configured to receive an input word and determine a part of speech (a POS tag) for the input word. In some examples, the input word can be included in a series of words. The POS tagger can take into account the context of the input word in the series of words to determine the part of speech. For example, the POS tagger can analyzing one or more words before the input word, one or more words after the input word, or both to determine the part of speech. In some examples, the POS tagger can provide a confidence value indicating a likelihood that the part of speech determined for the input word is correct. The processor can use the confidence value as the POS tag confidence.

In some examples, the processor can determine one POS tag confidence for the noncanonical communication and another POS tag confidence for a candidate canonical version. The processor can determine a difference between the POS tag confidence for the noncanonical communication and the POS tag confidence for the candidate canonical version. For example, the processor can determine that a POS tag confidence for the noncanonical communication is 97.5%. The processor can determine that another POS tag confidence for a candidate canonical version that is 97%. The processor can determine that the difference between the POS tag confidence for the noncanonical communication and the POS tag confidence for the candidate canonical version is −0.5%. This may indicate that the candidate canonical version is worse than the noncanonical communication. As another example, the processor can determine that a POS tag confidence for another candidate canonical version that is 98%. The processor can determine that the difference between the POS tag confidence for the noncanonical communication and the POS tag confidence for the candidate canonical version is +0.5%. This may indicate that the candidate canonical version is better than the noncanonical communication. The processor can use the difference as the POS tag confidence and supply the difference to the classifier.

In some examples, the processor can determine a mean POS tagging confidence of a noncanonical communication. For example, the processor can determine the mean POS tagging confidence by aggregating the POS tagging confidences for a number of words in the noncanonical communication to generate a total POS tagging confidence. The processor can divide the total POS tagging confidence by the number of words to determine the mean POS tagging confidence. In some examples, the processor can use the mean POS tagging confidence as a baseline. Thereafter, the processor can replace a noncanonical word in the noncanonical communication with a candidate canonical version and determine a new mean POS tagging confidence. Replacing the noncanonical word in the noncanonical communication with the candidate canonical version can cause the new mean POS tagging confidence to be different than the mean POS tagging confidence used as the baseline. In some examples, the processor can determine a difference between the new mean POS tagging confidence and the POS tagging confidence used as the baseline. The processor can use the difference as the POS tag confidence and supply the difference to the classifier.

The classifier can additionally or alternatively use other information to determine the confidence score. For example, the noncanonical communication can include a series of words. The classifier can use a POS tag associated with a word prior to a noncanonical word in the series of words, a POS tag associated with a candidate canonical version for the noncanonical word, a POS tag associated with a word subsequent to the noncanonical word in the series of words, or any combination of these to determine the confidence score. In some examples, the classifier can use all three of the above-mentioned POS tags to determine the confidence score. For example, the classifier can detect one or more patterns associated with the series of the three POS tags. The one or more patterns can indicate a likelihood that a particular candidate canonical version is correct. The classifier can use the one or more patterns to determine the confidence score.

Referring back to FIG. 9, in block 906, the processor can select the candidate canonical version associated with the highest confidence score as the normalized version of the noncanonical communication. For example, the processor can analyze the confidence score for each of the candidate canonical versions and select the candidate canonical version corresponding to the highest confidence score as the normalized version of the noncanonical communication.

Example of an Implementation—Constrained Mode

Various aspects of the present disclosure can be implemented in a constrained mode. The constrained mode can use a mapping database in which noncanonical words are mapped to known canonical versions (e.g., based on training data). For example, the mapping database can include the noncanonical word "ur" mapped to canonical versions "ur," "your," and "you're." The constrained mode can also use a listing database. The listing database can include multiple canonical words in list form (e.g., rather than being mapped to noncanonical words). In some examples, the mapping database, the listing database, or both can be generated based on training data and/or using human annotation. For example, the mapping database and the listing database can be generated using all canonical versions present in the training data.

The mapping database can be analyzed to determine if a noncanonical word has at least one corresponding canonical version stored in the mapping database. If so, the corresponding canonical versions can be used as candidate canonical versions for the noncanonical word. If not, the top-1 candidate (as determined based on the Jaccard Index value) can be used as the candidate canonical version for the noncanonical word.

The listing database can additionally or alternatively be used to determine a candidate canonical version of a noncancoial word if the noncanonical word includes repetitive adjacent characters. This may provide redundancy for candidate canonical versions determined using the mapping database, or may produce a candidate canonical version for a noncanonical communication when the mapping database fails to do so.

In the constrained mode, a classifier (e.g., used for determining confidence scores for candidate canonical versions of a noncanonical word) can be trained using the same training data used for generating the mapping database. This can lead to improved accuracy over, for example, training the classifier using another data set.

The classifier can be configured to use any number of parameters (such as a support value, a confidence value, a POS tag confidence value, a similarity score, or any combination of these) to determine a confidence score for a particular candidate version of a noncanonical communication. Some parameters can improve overall accuracy more than others. For example, FIG. 11 shows a table 1100 of an example of results using the constrained mode implementation while varying the different parameters used by the classifier. In FIG. 11, precision 1102 can represent the capability of a model to not normalize what does not need normalizing, recall 1104 can represent the capability of a model to correctly identify what needs to be normalized and correctly normalize it, and F1 score 1106 can include a number between zero and one that can represent accuracy. In some examples, the F1 score can be based on precision 1102 and recall 1104. For example, the F1 score can be determined according to the following algorithm:

$$F1 score = 2*(Precision*Recall)/(Precision+Recall).$$

As shown in FIG. 11, the support value and confidence value can impact the F1 score more than any of the classifier parameters. For example, if the classifier is configured not to use the support value and the confidence value, as shown in row 1108, the F1 score can decrease by 0.0521. FIG. 11 also indicates that the POS tagging confidence can also greatly impact the F1 score. For example, if the classifier is configured not to use the POS tagging confidence, as shown in row 1110, the F1 score can decrease by 0.0129. The similarity score can be the least important classifier parameter, and can lead to a marginal improvement in F1 score. Thus, different classifier configurations can directly impact accuracy.

Example of an Implementation—Unconstrained Mode

Various aspects of the present disclosure can be implemented in an unconstrained mode. The unconstrained mode can use a mapping database and a listing database, for example, as discussed above with respect to the constrained mode example implementation. But in the unconstrained mode, the listing database can further include at least a portion of an English dictionary. For example, the listing database can include multiple canonical words determined using training data and/or human annotation. The listing database can also include all the words from (e.g., extracted from) an English lexicon dictionary.

The mapping database can be analyzed to determine if a noncanonical word has at least one corresponding canonical version stored in the mapping database. If so, the corresponding canonical versions can be used as candidate canonical versions for the noncanonical word. If not, the top-3 candidates (as determined based on the Jaccard Index value) can be used as candidate canonical versions for the noncanonical word. The listing database can additionally or alternatively be used as discussed above with respect to the constrained mode.

In the unconstrained mode, the classifier can be configured using any of the configurations discussed above with respect to the constrained mode. In some examples, the classifier can be trained using different data than is used for constructing the mapping database, the listing database, or both. For example, a training data set can be split into two groups, in which the first group includes 67% of the data in the training data set and the second group includes 33% of the data in the training data set. The first group can be used to construct the mapping database, the listing database, or both. The second group can be used to train the classifier.

Figure 12:
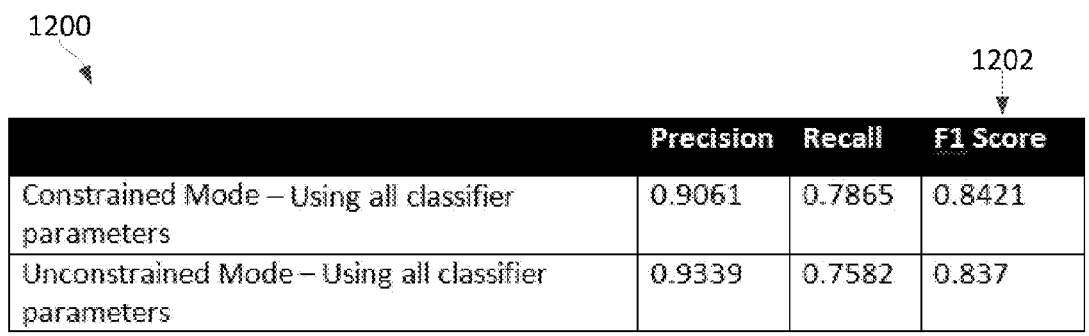
FIG. 12 shows a table of an example of a comparison between the results of the constrained mode and the results of the unconstrained mode according to some aspects.

In some examples, the unconstrained mode may perform worse than the constrained mode. For example, FIG. 12 shows a table 1200 of an example of a comparison between results of the constrained mode and the results of the unconstrained mode. As shown in FIG. 12, the constrained mode's F1 score 1202 can have a better score than the unconstrained mode. Two factors may cause the F1 score of the unconstrained mode to be lower than the F1 score of the unconstrained mode. First, the unconstrained mode can use both training data from a training data file as well as data from an English dictionary, resulting in a much larger amount of data than is used for the constrained mode. This larger amount of data can include many rarely used words. The inclusion of many rarely used words can cause the candidate selection process to be more conservative (e.g., a higher precision and lower recall). One potential solution is to use a smaller amount of data, including the most frequently used words. Second, the larger amount of data can result in an increased number of candidate canonical versions for each noncanonical word, making selecting the correct canonical version of a noncanonical word more challenging. One potential solution is to provide the classifier with more context information about the noncanonical word.

In some examples, the classifier can be configured to use a two-step classification process. This can improve the accuracy of the classifier. In the first step, the classifier can determine whether a candidate canonical version is different from the noncanonical communication. For example, if the noncanonical communication is "car" and the candidate canonical version is "car", the classifier can determine that the noncanonical communication is the same as the candidate canonical version. As another example, if the noncanonical communication is "ur" and the candidate canonical version is "your", the classifier can determine that the noncanonical communication is different from the candidate canonical version. If the classifier determines that the noncanonical communication is the same as the candidate canonical version, than the classifier uses the noncanonical communication as the output. If the classifier determines that the noncanonical communication is different from the candidate canonical version, then the second step can assign a confidence score to the candidate canonical version. The classifier can assign a confidence score to each candidate canonical version that is different from the noncanonical communication and select the candidate canonical version with the highest score as the output.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer readable medium comprising program code executable by a processor for causing the processor to:
receive an electronic representation of a noncanonical communication;
determine a plurality of candidate canonical versions of the noncanonical communication using a database generated using training data;
determine a first feature set representative of the noncanonical communication by splitting the noncanonical communication into at least one n-gram and at least one k-skip-n-gram,
wherein an n-gram comprises a sequence of a predefined number of adjacent characters, and
wherein a k-skip-n-gram comprises a sequence of nonadjacent characters in a communication selected such that a maximum number of skipped characters are positioned between each of the nonadjacent characters in the communication;
determine a plurality of comparison feature sets by splitting each term in a plurality of terms in the training data into a respective comparison feature set comprising at least one n-gram and at least one k-skip-n-gram;
determine a plurality of Jaccard index values using the first feature set and the plurality of comparison feature sets, each Jaccard index value of the plurality of Jaccard index values being representative of a similarity between the noncanonical communication and a term of the plurality of terms in the training data;
select a subset of the plurality of terms in the training data in which an associated Jaccard index value exceeds a threshold;
include the subset of the plurality of terms in the plurality of candidate canonical versions of the noncanonical communication; and
select a normalized version of the noncanonical communication from the plurality of candidate canonical versions.

2. The non-transitory computer readable medium of claim 1, wherein the predefined number of adjacent characters is two and the maximum number of skipped characters is one.

3. The non-transitory computer readable medium of claim 2, further comprising program code executable by the processor for causing the processor to:
select the normalized version of the noncanonical communication from the plurality of candidate canonical versions by:
determining a confidence score for each candidate canonical version of the plurality of candidate canonical versions using a classifier; and
selecting a candidate from the plurality of candidate canonical versions associated with a highest confidence score as the normalized version of the noncanonical communication.

4. The non-transitory computer readable medium of claim 3, wherein the classifier is configured to use a Jaccard index value associated with a respective candidate canonical version to determine the confidence score for the respective candidate canonical version.

5. The non-transitory computer readable medium of claim 3, wherein the classifier is configured to use a support value and a confidence value associated with a respective candidate canonical version to determine the confidence score for the respective candidate canonical version,
wherein the support value comprises a number of times the respective candidate canonical version occurs in the training data used for generating the plurality of candidate canonical versions of the noncanonical communication, and
wherein the confidence value comprises a ratio of an amount of times the respective candidate canonical version was selected as the normalized version of the noncanonical communication divided by another amount of times the noncanonical communication is present in the training data.

6. The non-transitory computer readable medium of claim 3, wherein the classifier is configured to use a difference between a first number of characters in a respective candidate canonical version and a second number of characters in the noncanonical communication to determine the confidence score for the respective candidate canonical version.

7. The non-transitory computer readable medium of claim 3, wherein the classifier is configured to use a confidence difference between a first part of speech (POS) tag confidence associated with a respective candidate canonical version and a second POS tag confidence associated with the noncanonical communication to determine the confidence score for the respective candidate canonical version, the first POS tag confidence and the second POS tag confidence being determinable by a POS tagger.

8. The non-transitory computer readable medium of claim 1, further comprising program code executable by the processor for causing the processor to:
receive the electronic representation of the noncanonical communication from a text message, an e-mail, an electronic document, a social media post, a tweet, a blog post, a forum post, media content, or streaming content.

9. The non-transitory computer readable medium of claim 1, further comprising program code executable by the processor for causing the processor to:
include the normalized version of the noncanonical communication in a data set for use in textual analysis; and
perform textual analysis on the data set to determine one or more trends indicated by the data set.

10. The non-transitory computer readable medium of claim 1, further comprising program code executable by the processor for causing the processor to:
determine at least one Jaccard index value of the plurality of Jaccard Index values by weighting at least one feature of a comparison feature set.

11. A method comprising:
receiving an electronic representation of a noncanonical communication;
determining a plurality of candidate canonical versions of the noncanonical communication using a database generated using training data;
determining a first feature set representative of the noncanonical communication by splitting the noncanonical communication into at least one n-gram and at least one k-skip-n-gram,
wherein an n-gram comprises a sequence of a predefined number of adjacent characters in a communication, and
wherein a k-skip-n-gram comprises a sequence of nonadjacent characters in the communication selected such that a maximum number of skipped characters are positioned between each of the nonadjacent characters in the communication;
determining a plurality of comparison feature sets by splitting each term in a plurality of terms in the training data into a respective comparison feature set comprising at least one n-gram and at least one k-skip-n-gram;
determining a plurality of Jaccard index values using the first feature set and the plurality of comparison feature sets, each Jaccard index value of the plurality of Jaccard index values being representative of a similarity between the noncanonical communication and a term of the plurality of terms in the training data;
selecting a subset of the plurality of terms in the training data in which an associated Jaccard index value exceeds a threshold;
including the subset of the plurality of terms in the plurality of candidate canonical versions of the noncanonical communication; and
selecting a normalized version of the noncanonical communication from the plurality of candidate canonical versions.

12. The method of claim 11, wherein the predefined number of adjacent characters is two and the maximum number of skipped characters is one.

13. The method of claim 12, further comprising:
selecting the normalized version of the noncanonical communication from the subset of the plurality of candidate canonical versions by:
determining a confidence score for each candidate canonical version of the subset using a classifier; and
selecting a candidate from the subset of the plurality of candidate canonical versions associated with a highest confidence score as the normalized version of the noncanonical communication.

14. The method of claim 13, wherein the classifier is configured to use a Jaccard index value associated with a respective candidate canonical version to determine the confidence score for the respective candidate canonical version.

15. The method of claim 13, wherein the classifier is configured to use a support value and a confidence value associated with a respective candidate canonical version to determine the confidence score for the respective candidate canonical version,
wherein the support value comprises a number of times the respective candidate canonical version occurs in the training data used for generating the plurality of candidate canonical versions of the noncanonical communication, and
wherein the confidence value comprises a ratio of an amount of times the respective candidate canonical version was selected as the normalized version of the noncanonical communication divided by another amount of times the noncanonical communication is present in the training data.

16. The method of claim 13, wherein the classifier is configured to use a difference between a first number of characters in a respective candidate canonical version and a second number of characters in the noncanonical communication to determine the confidence score for the respective candidate canonical version.

17. The method of claim 13, wherein the classifier is configured to use a confidence difference between a first part of speech (POS) tag confidence associated with a respective candidate canonical version and a second POS tag confidence associated with the noncanonical communication to determine the confidence score for the respective candidate canonical version, the first POS tag confidence and the second POS tag confidence being determinable by a POS tagger.

18. The method of claim 11, further comprising:
receiving the electronic representation of the noncanonical communication from a text message, an e-mail, an electronic document, a social media post, a tweet, a blog post, a forum post, media content, or streaming content.

19. The method of claim 11, further comprising:
including the normalized version of the noncanonical communication in a data set for use in textual analysis; and
performing textual analysis on the data set to determine one or more trends indicated by the data set.

20. The method of claim 11, further comprising:
determining at least one Jaccard index value of the plurality of Jaccard Index values by weighting at least one feature of a comparison feature set.

21. A system comprising:
a processing device; and
a memory device in which instructions executable by the processing device are stored for causing the processing device to:
receive an electronic representation of a noncanonical communication;
determine a plurality of candidate canonical versions of the noncanonical communication using a database generated using training data;
determine a first feature set representative of the noncanonical communication by splitting the noncanonical communication into at least one n-gram and at least one k-skip-n-gram,
wherein an n-gram comprises a sequence of a predefined number of adjacent characters, and
wherein a k-skip-n-gram comprises a sequence of nonadjacent characters in a communication selected such that a maximum number of skipped characters are positioned between each of the nonadjacent characters in the communication;
determine a plurality of comparison feature sets by splitting each term in a plurality of terms in the training data into a respective comparison feature set comprising at least one n-gram and at least one k-skip-n-gram;
determine a plurality of Jaccard index values using the first feature set and the plurality of comparison feature sets, each Jaccard index value of the plurality of Jaccard index values being representative of a similarity between the noncanonical communication and a term of the plurality of terms in the training data;
select a subset of the plurality of terms in the training data in which an associated Jaccard index value exceeds a threshold;
include the subset of the plurality of terms in the plurality of candidate canonical versions of the noncanonical communication; and
select a normalized version of the noncanonical communication from the plurality of candidate canonical versions.

22. The system of claim 21, wherein the predefined number of adjacent characters is two and the maximum number of skipped characters is one.

23. The system of claim 22, wherein the memory device further comprises instructions executable by the processing device for causing the processing device to:
select the normalized version of the noncanonical communication from the subset of the plurality of candidate canonical versions by:
determining a confidence score for each candidate canonical version of the plurality of candidate canonical versions using a classifier; and
selecting a candidate from the plurality of candidate canonical versions associated with a highest confidence score as the normalized version of the noncanonical communication.

24. The system of claim 23, wherein the classifier is configured to use a Jaccard index value associated with a respective candidate canonical version to determine the confidence score for the respective candidate canonical version.

25. The system of claim 23, wherein the classifier is configured to use a support value and a confidence value associated with a respective candidate canonical version to determine the confidence score for the respective candidate canonical version,
wherein the support value comprises a number of times the respective candidate canonical version occurs in the training data used for generating the plurality of candidate canonical versions of the noncanonical communication, and
wherein the confidence value comprises a ratio of an amount of times the respective candidate canonical version was selected as the normalized version of the noncanonical communication divided by another amount of times the noncanonical communication is present in the training data.

26. The system of claim 23, wherein the classifier is configured to use a difference between a first number of characters in a respective candidate canonical version and a second number of characters in the noncanonical communication to determine the confidence score for the respective candidate canonical version.

27. The system of claim 23, wherein the classifier is configured to use a confidence difference between a first part of speech (POS) tag confidence associated with a respective candidate canonical version and a second POS tag confidence associated with the noncanonical communication to determine the confidence score for the respective candidate canonical version, the first POS tag confidence and the second POS tag confidence being determinable by a POS tagger.

28. The system of claim 21, wherein the memory device further comprises instructions executable by the processing device for causing the processing device to:
receive the electronic representation of the noncanonical communication from a text message, an e-mail, an electronic document, a social media post, a tweet, a blog post, a forum post, media content, or streaming content.

29. The system of claim 21, wherein the memory device further comprises instructions executable by the processing device for causing the processing device to:
include the normalized version of the noncanonical communication in a data set for use in textual analysis; and
perform textual analysis on the data set to determine one or more trends indicated by the data set.

30. The system of claim 21, wherein the memory device further comprises instructions executable by the processing device for causing the processing device to:
determine at least one Jaccard index value of the plurality of Jaccard Index values by weighting at least one feature of a comparison feature set.

* * * * *